United States Patent
Kurita et al.

(10) Patent No.: US 8,722,212 B2
(45) Date of Patent: May 13, 2014

(54) MAGNETIC RECORDING MEDIUM WITH A NON-MAGNETIC GRANULAR LAYER UNDER A PLURALITY OF GRANULAR MAGNETIC LAYERS AND STORAGE APPARATUS

(75) Inventors: Ryo Kurita, Kawasaki (JP); Satoshi Igarashi, Higashine (JP); Isatake Kaitsu, Kawasaki (JP); Akira Kikuchi, Higashine (JP)

(73) Assignee: Showa Denko K.K., Tokyo (JP)

( * ) Notice: Subject to any disclaimer, the term of this patent is extended or adjusted under 35 U.S.C. 154(b) by 153 days.

(21) Appl. No.: 13/257,227

(22) PCT Filed: Mar. 2, 2010

(86) PCT No.: PCT/JP2010/053358
§ 371 (c)(1),
(2), (4) Date: Oct. 6, 2011

(87) PCT Pub. No.: WO2010/106911
PCT Pub. Date: Sep. 23, 2010

(65) Prior Publication Data
US 2012/0019959 A1    Jan. 26, 2012

(30) Foreign Application Priority Data
Mar. 19, 2009 (JP) .................................. 2009-069062

(51) Int. Cl.
*G11B 5/66* (2006.01)

(52) U.S. Cl.
USPC ...................... 428/829; 428/831.2; 428/836.2; 428/836.3

(58) Field of Classification Search
None
See application file for complete search history.

(56) References Cited

U.S. PATENT DOCUMENTS

| | | | |
|---|---|---|---|
| 7,892,663 B2* | 2/2011 | Nakagawa et al. ............ 428/829 |
| 7,976,965 B2* | 7/2011 | Shimizu et al. ............. 428/828.1 |
| 8,119,264 B2* | 2/2012 | Marinero .................. 428/831.2 |
| 8,440,332 B2* | 5/2013 | Tamai et al. ................. 428/829 |
| 2006/0057431 A1 | 3/2006 | Tamai et al. |
| 2006/0204791 A1* | 9/2006 | Sakawaki et al. .......... 428/828.1 |
| 2008/0096053 A1* | 4/2008 | Bian et al. ..................... 428/829 |
| 2008/0285177 A1 | 11/2008 | Inamura et al. |
| 2008/0292909 A1 | 11/2008 | Igarashi et al. |
| 2009/0142624 A1* | 6/2009 | Takahoshi et al. ......... 428/846.6 |
| 2009/0242389 A1* | 10/2009 | Asakura et al. .......... 204/192.15 |
| 2010/0007988 A1 | 1/2010 | Igarashi et al. |
| 2010/0209740 A1 | 8/2010 | Ayama et al. |
| 2011/0104516 A1 | 5/2011 | Umezawa |

FOREIGN PATENT DOCUMENTS

| | | |
|---|---|---|
| JP | 62-239314 A | 10/1987 |
| JP | 2002-203306 A | 7/2002 |
| JP | 2004-310910 A1 | 11/2004 |
| JP | 2006-85742 A | 3/2006 |
| JP | 2008-287771 A | 11/2008 |
| JP | 2008-293559 A | 12/2008 |

(Continued)

*Primary Examiner* — Kevin Bernatz
(74) *Attorney, Agent, or Firm* — Sughrue Mion, PLLC (57) ABSTRACT

A magnetic recording medium includes a non-magnetic granular layer, and a recording layer provided on the non-magnetic granular layer, wherein the recording layer includes a first granular magnetic layer provided on the non-magnetic granular layer, and a second granular magnetic layer provided on the first granular magnetic layer, and a non-magnetic material magnetically separating metal grains of the non-magnetic granular layer is different from a non-magnetic material magnetically separating magnetic grains of the first granular magnetic layer.

10 Claims, 6 Drawing Sheets

(56) References Cited

FOREIGN PATENT DOCUMENTS

| | | | |
|---|---|---|---|
| JP | 2009-99243 A | 5/2009 | |
| JP | 2009-245479 A | 10/2009 | |
| JP | 2010-20854 A | 1/2010 | |
| JP | 2010-86583 A | 4/2010 | |
| WO | 2009/041656 A1 | 4/2009 | |
| WO | 2009/119636 A1 | 10/2009 | |

* cited by examiner

| SAMPLE | NON-MAGNETIC GRANULAR LAYER 14 | FIRST GRANULAR MAGNETIC LAYER 15 | SECOND GRANULAR MAGNETIC LAYER 16 |
|---|---|---|---|
| S1 | $CoCr-Cr_2O_3$ | $CoCrPt-Cr_2O_3$ | $CoCrPt-TiO_2$ |
| S2 | $CoCr-SiO_2$ | $CoCrPt-SiO_2$ | $CoCrPt-TiO_2$ |
| S3 | $CoCr-Cr_2O_3$ | $CoCrPt-SiO_2$ | $CoCrPt-TiO_2$ |
| S4 | $CoCr-SiO_2$ | $CoCrPt-Cr_2O_3$ | $CoCrPt-TiO_2$ |
| S5 | $CoCr-Cr_2O_3$ | $CoCrPt-SiO_2$ | $CoCrPt-TiO_2$ |
| S6 | $CoCr-Cr_2O_3$ | $CoCrPt-TiO_2$ | $CoCrPt-SiO_2$ |
| S7 | $CoCr-Cr_2O_3$ | | $CoCrPt-TiO_2$ |

FIG.3

| SAMPLE | Hc(Oe) | ΔHs(Oe) | $\alpha'$ |
|---|---|---|---|
| S1 | 4756 | 1693 | 1.32 |
| S2 | 4697 | 1008 | 1.10 |
| S3 | 4824 | 903 | 1.09 |
| S4 | 4887 | 866 | 1.14 |
| S5 | 5124 | 934 | 1.17 |
| S6 | 4913 | 927 | 1.15 |
| S7 | 4671 | 3346 | 1.45 |

MAGNETIC RECORDING MEDIUM WITH A NON-MAGNETIC GRANULAR LAYER UNDER A PLURALITY OF GRANULAR MAGNETIC LAYERS AND STORAGE APPARATUS

CROSS REFERENCE TO RELATED APPLICATIONS

This application is a National Stage of International Application No. PCT/JP2010/053358 filed Mar. 2, 2010, claiming priority based on Japanese Patent Application No. 2009-069062 filed Mar. 19, 2009.

TECHNICAL FIELD

The present invention generally relates to magnetic recording media and storage apparatuses, and more particularly to a magnetic recording medium having a recording layer with a multi-layer structure and to a storage apparatus provided with such a magnetic recording medium.

BACKGROUND ART

A typical example of a storage apparatus provided with a magnetic recording medium may be a HDD (Hard Disk Drive) having a magnetic disk. The HDD is not only used in computers, but also in video recording apparatuses, portable music players, and the like. Because the HDD is used in various kinds of apparatuses, there are demands to further increase the storage capacity and to further reduce the size of the HDD.

In order to increase the storage capacity and reduce the size of the HDD, it is necessary to improve the recording density of the magnetic disk. Conventionally, the magnetic disk generally employs the longitudinal magnetic recording system that orients an axis of easy magnetization of a recording layer in a direction parallel to a substrate surface. On the other hand, the recently developed magnetic disk employs the perpendicular magnetic recording system that orients the axis of easy magnetization of the recording layer in a direction perpendicular to the substrate surface. In the perpendicular magnetic disk, the effects of demagnetization is small at recording bit boundaries of the recording layer, and thus, a high-density recording of data is possible because the data may be recorded sharply. In addition, perpendicular magnetic disks have been proposed (Patent Documents 1 and 2) in which a back layer formed by a soft magnetic material is provided under the recording layer in order to further improve the recording density.

The general perpendicular magnetic disk has a structure in which a soft back layer having a thickness of approximately 30 nm to 100 nm, a seed layer, an intermediate layer, a granular layer formed by a Co-based alloy and an oxide, a Co-based alloy layer including no oxide, a carbon protection layer, a lubricant layer, and the like are stacked on a non-magnetic substrate made of glass or the like. In the HDD provided with the perpendicular magnetic disk, a magnetic head is used to record data on the perpendicular magnetic disk. Magnetic flux generated from the magnetic head penetrates the recording layer perpendicularly towards the back layer, and magnetizes the recording layer in the perpendicular direction.

In a granular recording layer, a non-magnetic oxide material is formed at grain boundaries of magnetic crystal grains and magnetically separates or isolates the magnetic crystal grains, to thereby reduce medium noise. The granular recording layer is sometimes also referred to as a recording layer having a granular structure.

In order to further improve the recording density of the perpendicular magnetic disk, it is necessary to improve the signal quality of the data recorded on the perpendicular magnetic disk, such as the error rate and the SNR (Signal-to-Noise Ratio). Improving the performance of the recording layer is important in improving the signal quality of the data recorded on the perpendicular magnetic disk. More particularly, it is necessary to reduce the size of the magnetic crystal grains, make the magnetic crystal grain sizes uniform, and reduce the variation in the crystal orientation of the magnetic crystal grains in the recording layer. For this reason, the size of the magnetic crystal grains is reduced, the magnetic crystal grain sizes are made uniform, and the variation in the crystal orientation of the magnetic crystal grains is reduced, by taking measures such as forming the intermediate layer by a Ru layer having a physical segregation structure, forming the recording layer by a granular recording layer including an oxide, and further making the intermediate layer or the recording layer have a multi-layer structure or providing a non-magnetic granular layer. However, in order to further improve the recording density, it may be desirable to further reduce the size of the magnetic crystal grains, make the magnetic crystal grain sizes more uniform, and further reduce the variation in the crystal orientation of the magnetic crystal grains.

PRIOR ART DOCUMENTS

Patent Documents

Patent Document 1: Japanese Laid-Open Patent Publication No. 2002-203306
Patent Document 2: Japanese Laid-Open Patent Publication No. 62-239314
Patent Document 3: Japanese Laid-Open Patent Publication No. 2004-310910
Patent Document 4: Japanese Laid-Open Patent Publication No. 2006-85742
Patent Document 5: Japanese Laid-Open Patent Publication No. 2008-287771

DISCLOSURE OF THE INVENTION

Problems to be Solved by the Invention

According to the conventional magnetic recording medium, there was a problem in that it is difficult to further improve the recording density, because it is difficult to further reduce the size of the magnetic crystal grains, make the magnetic crystal grain sizes more uniform, and further reduce the variation in the crystal orientation of the magnetic crystal grains.

Accordingly, it is an object of the present invention to provide a magnetic recording medium and a storage apparatus which may further improve the recording density.

Means of Solving the Problem

According to one aspect of the present invention, there is provided a magnetic recording medium including a non-magnetic granular layer; and a recording layer provided on the non-magnetic granular layer, wherein the recording layer includes a first granular magnetic layer provided on the non-magnetic granular layer, and a second granular magnetic layer provided on the first granular magnetic layer, and wherein a non-magnetic material magnetically separating metal grains of the non-magnetic granular layer is different from a non-magnetic material magnetically separating magnetic grains of the first granular magnetic layer.

According to another aspect of the present invention, there is provided a storage apparatus including at least one magnetic recording medium; and a magnetic head configured to write information on and/or read information from the magnetic recording medium, wherein the magnetic recording medium includes a non-magnetic granular layer; and a recording layer provided on the non-magnetic granular layer, wherein the recording layer includes a first granular magnetic layer provided on the non-magnetic granular layer, and a second granular magnetic layer provided on the first granular magnetic layer, and wherein a non-magnetic material magnetically separating metal grains of the non-magnetic granular layer is different from a non-magnetic material magnetically separating magnetic grains of the first granular magnetic layer.

Effects of the Invention

According to the disclosed magnetic recording medium and storage apparatus, it may be possible to further improve the recording density.

MODE OF CARRYING OUT THE INVENTION

The disclosed magnetic recording medium and storage apparatus include a non-magnetic granular layer, and a recording layer provided on the non-magnetic granular layer, and the recording layer includes a first granular magnetic layer provided on the non-magnetic granular layer, and a second granular magnetic layer provided on the first granular magnetic layer. A non-magnetic material magnetically separating metal grains of the non-magnetic granular layer differs from a non-magnetic material magnetically separating magnetic grains of the first granular magnetic layer.

It may further be preferable that the non-magnetic material magnetically separating the magnetic grains of the first granular magnetic layer is different from a non-magnetic material magnetically separating magnetic grains of the second granular magnetic layer.

By at least making the non-magnetic materials used by the non-magnetic granular layer and the first granular magnetic mutually different, it may be possible to further reduce the size of the magnetic crystal grains forming the second granular magnetic layer, make the magnetic crystal grain sizes of the second granular magnetic layer more uniform, and further reduce the variation in the crystal orientation of the magnetic crystal grains in the second granular magnetic layer. Hence, a further improvement of the recording density may be possible.

A description will now be given of each embodiment of the magnetic recording medium and the storage apparatus according to the present invention, by referring to the figures.

EMBODIMENTS

Figure 1:
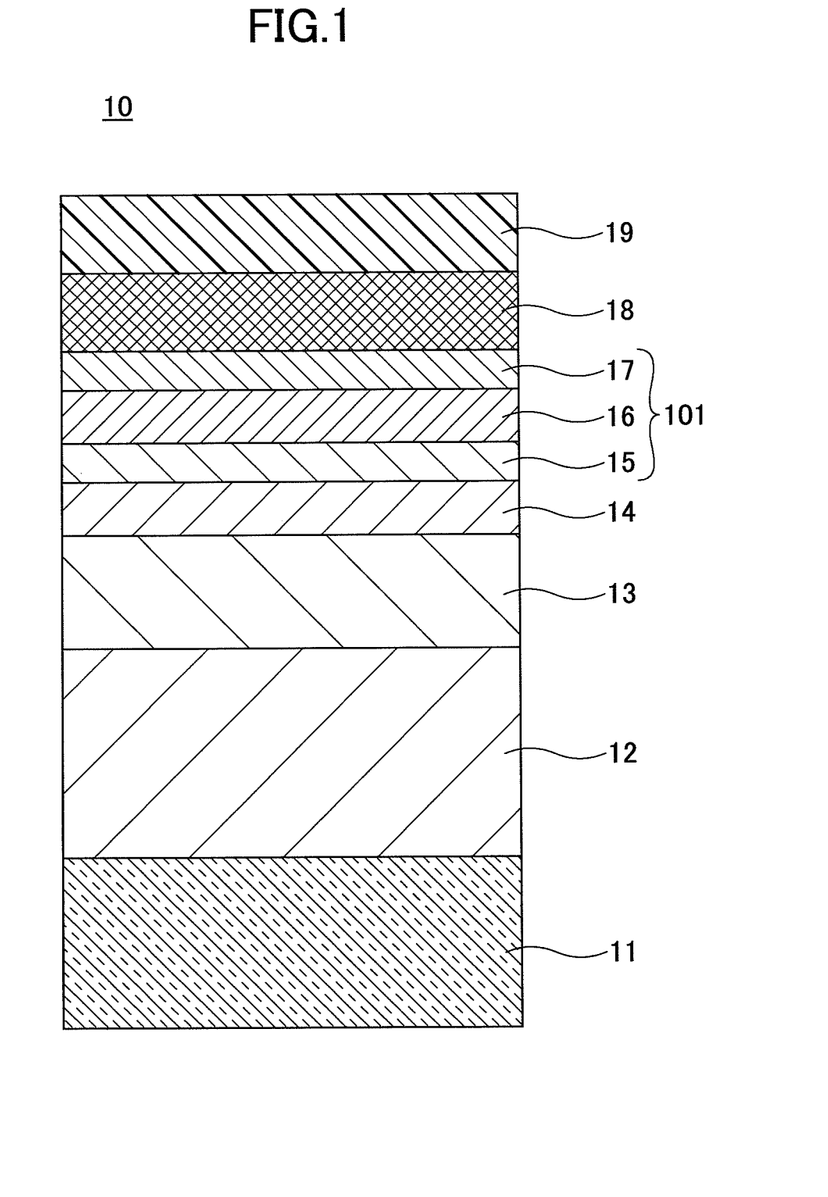
FIG. 1 is a cross sectional view illustrating a structure of a magnetic recording medium in a first embodiment of the present invention.

FIG. 1 is a cross sectional view illustrating a structure of the magnetic recording medium in a first embodiment of the present invention. In this embodiment, the present invention is applied to a perpendicular magnetic recording medium.

As illustrated in FIG. 1, a perpendicular magnetic recording medium 10 has a structure including a soft magnetic back layer 12, an intermediate layer 13, a non-magnetic granular layer 14, a first granular magnetic layer 15, a second granular magnetic layer 16, a cap layer 17, a protection layer 18, and a lubricant layer 18 that are stacked on a substrate 11. The granular magnetic layers 15 and 16 form a recording layer 101.

The substrate 11 may be formed by a non-magnetic material, such as glass, aluminum alloy, and the like. The substrate 11 is required to have a flat surface and a relatively high mechanical strength.

For example, the soft magnetic back layer 12 may be formed by a soft magnetic material such as SoZrNb, CoZrTa, FeCoB, FeTaC, FeTaN, FeAlSi, FeCoAlO, CoNiFeB, $CoFe_2O_4$, $ZnFe_2O_4$, CoFe, and the like.

The intermediate layer 13 is provided to control the crystal orientation and the crystal grain diameter of the non-magnetic granular layer 14 and the granular magnetic layers 15 and 16 formed on the intermediate layer 13. For example, the intermediate layer 13 may be formed by a stacked layer structure (Ta/NiW/Ru layer) in which layers of Ta, NiW and Ru are successively stacked from the bottom in this order, a stacked layer structure (Ta/Ru layer) in which Ta and Ru are successively stacked from the bottom in this order, a stacked layer structure (Ta/NiWCr/Ru layer) in which layers of Ta, NiWCr and Ru are successively stacked from the bottom in this order, and the like. In the stacked layer structure forming the intermediate layer 13, an Ru alloy may be used in place of Ru.

The non-magnetic granular layer 14 is provided to promote magnetic separation or isolation of magnetic crystal grains of the recording layer 101. The non-magnetic granular layer 14 has a granular structure in which the metal crystal grains having the axes of easy magnetization oriented perpendicularly to the substrate surface are magnetically separated by a non-magnetic material such as $SiO_2$, $TiO_2$, $Ta_2O_3$, and $Cr_2O_3$. In this embodiment, a non-magnetic oxide used for the non-magnetic material is $SiO_2$, however, the non-magnetic material is not limited to this material.

Each of the first granular magnetic layer 15 and the second granular magnetic layer 16 has a granular structure. At least one of the granular magnetic layers 15 and 16 has a hard magnetic characteristic or property of $2 \times 10^6$ erg/cc or greater, and retains data by being magnetized in the perpendicular direction by a magnetic field generated by a magnetic head (not illustrated). The granular magnetic layers 15 and 16 may be formed by $CoCrPt$—$SiO_2$, $CoPt$—$SiO_2$, and the like. The granular structure of each of the granular magnetic layers 15 and 16 magnetically separates the magnetic crystal grains by the non-magnetic material such as $SiO_2$, $TiO_2$, $Cr_2O_3$, and the like. In this embodiment, a non-magnetic oxide used for the non-magnetic material is $SiO_2$, however, the non-magnetic material is not limited to this material, and other composite oxides of $SiO_2$, $TiO_2$, $Cr_2O_3$, and the like may be used.

The cap layer 17 may be formed by a magnetic material having a non-granular structure and including no oxide. For example, the protection layer 18 may be formed by a relatively hard material, such as CN (Carbon Nitride), DLC (Diamond-Like Carbon), SiN (Silicon Nitride), and the like. For example, the lubricant layer 19 may be formed by a fluorinated or fluorine-based lubricant.

Next, a description will be given of a method of fabricating the perpendicular magnetic recording medium 10 illustrated in FIG. 1.

First, disk-shaped substrate 11 having a diameter of 2.5 inches and made of glass, aluminum alloy, or the like is prepared. This substrate 11 is set within a chamber of a magnetron sputtering apparatus, and the chamber is exhausted to vacuum. Thereafter, a soft magnetic material such as CoZrNb is formed by sputtering, in order to form a soft magnetic back layer 12 having a thickness of 30 nm to 100 nm on the substrate 11. The soft magnetic back layer 12 may be formed by plating.

Next, 1 nm of Ta, 3 nm to 8 nm of NiWCr, and 10 nm to 20 nm of Ru, for example, are successively sputtered on the soft magnetic back layer 12 in order to form an intermediate layer 13 having the stacked layer structure (Ta/NiWCr/Ru layer). The intermediate layer 13 may be formed by a stacked layer structure (Ta/Ru layer) formed by approximately 1 nm of Ta and 10 nm to 20 nm to Ru or, a stacked layer structure (Ta/NiW/Ru layer) formed by approximately 3 nm of Ta, approximately 3 nm to 8 nm of NiW and 10 nm to 20 nm of Ru.

Next, a layer having a granular structure of $CoCr$—$SiO_2$ is sputtered on the intermediate layer 13, in order to form a non-magnetic granular layer 14 to a thickness of 1 nm to 5 nm, for example.

Then, two layers having a granular structure of $CoCrPt$—$SiO_2$, for example, are sputtered on the non-magnetic granular layer 14, in order to form the granular magnetic layers 15 and 16 to a combined total thickness of 10 nm to 15 nm, for example.

A magnetic material having a non-granular structure is formed on the second granular magnetic layer 16, in order to form the cap layer 17. In addition, the protection layer 18 is formed to a thickness of 3 nm to 5 nm, for example, on the cap layer 17. When forming the protection layer 18 from CN by sputtering, carbon may be sputtered in an atmosphere including Ar gas and N gas. In addition, CVD (Chemical Vapor Deposition) may be employed when forming the protection layer 18 from DLC, and sputtering may be employed when forming the protection layer 18 from SiN.

Next, the lubricant layer 19 is formed on the protection layer 18. For example, the lubricant layer 19 may be formed by coating a layer of perfluoropolyether, fluorinated alcohol, or fluorinated carboxylic acid to a thickness of 0.5 nm to 5 nm.

The perpendicular magnetic recording medium 10 is completed in the above described manner.

The present inventors have fabricated samples S1 through S7 of the perpendicular magnetic recording medium 10 according to the fabrication method described above, in which the cap layer 17 of the embodiment is not formed, and measured static magnetic characteristics of each of the samples S1 through S7.

Figure 2:
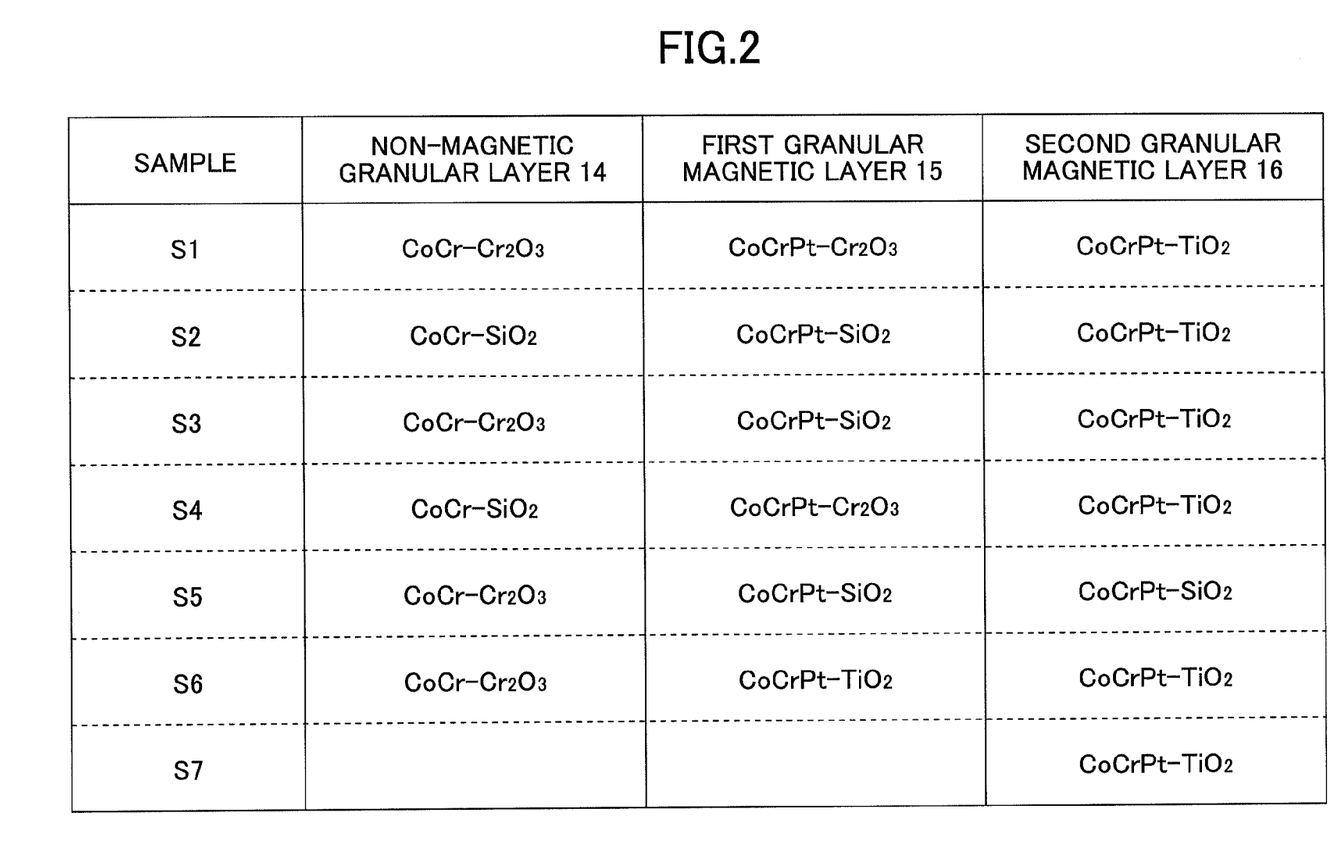
FIG. 2 is a diagram illustrating materials used for a non-magnetic granular layer and first and second granular magnetic layers when fabricating samples.

FIG. 2 is a diagram illustrating materials used for the non-magnetic granular layer 14 and the first and second granular magnetic layers 15 and 16 when fabricating the samples S1 through S7. In FIG. 2, $CoCrPt$—$TiO_2$ represents a layer of $Co_{74}Cr_{13}Pt_{13}$-$8TiO_2$ having a thickness of 10 nm, $CoCrPt$—$SiO_2$ represents a layer of $Co_{66}Cr_{13}Pt_{21}$—$SiO_2$ having a thickness of 2.5 nm, and $CoCr$—$Cr_2O_3$ represents $Co_{60}Cr_{40}$-$6Cr_2O_3$ having a thickness of 8 nm. The nonmagnetic granular layer 14 and the first granular magnetic layer 15 are not provided in the sample S7, and the recording layer 101 of the sample S7 has a single-layer structure formed solely of a $CoCrPt$—$TiO_2$ second granular magnetic layer 16.

Figure 3:
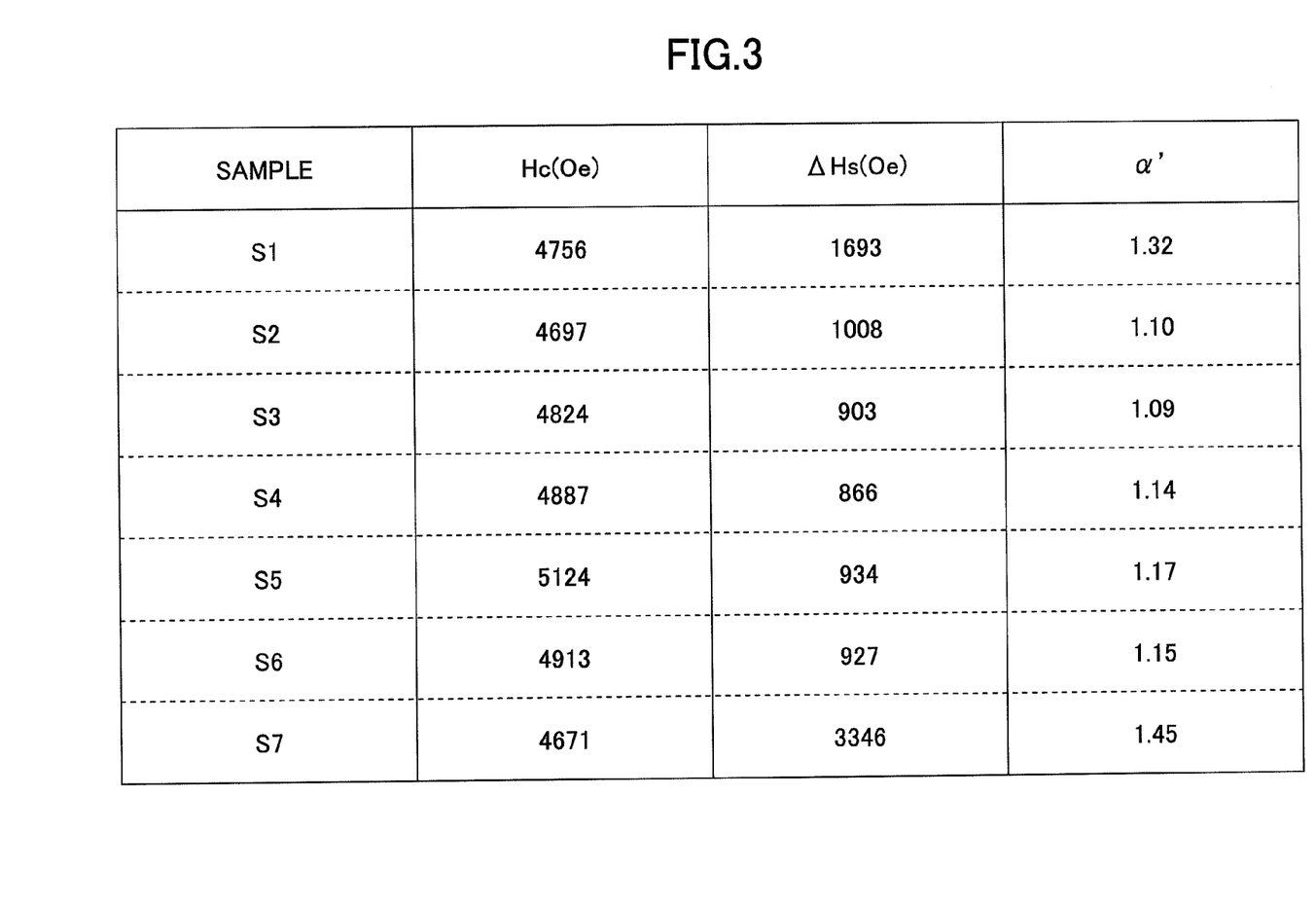
FIG. 3 is a diagram illustrating static magnetic characteristics measured for the samples.

FIG. 3 is a diagram illustrating the static magnetic characteristics measured for the samples S1 through S7. In FIG. 3, Hc (Oe) denotes the coercivity of the samples S1 through S7, ΔHs (Oe) denotes a parameter indicating a variation of crystal orientation in the recording layer 101, and α' denotes a parameter indicating the magnetic separation or isolation of the magnetic crystal grains in the recording layer 101. It may be desirable that the coercivity Hc has a large value, and that the parameters ΔHs and α' both have a small value.

As may be seen from FIGS. 2 and 3, in the case of the samples S1 and S2 in which the oxide materials of the adjacent non-magnetic granular layer 14 and the first granular magnetic layer 15 are the same and are $Cr_2O_3$ and $SiO_2$, respectively, it was confirmed that the coercivity Hc becomes small and the parameters ΔHs and α' become large.

On the other hand, in the case of the samples S3 and S4 in which the oxide materials of the adjacent non-magnetic granular layer 14 and the first and second granular magnetic layers 15 and 16 are all different (or, the oxide materials having the maximum content in each of the layers 14 through 16 differ), and in the case of the samples S5 and S6 in which the oxide materials of the adjacent non-magnetic granular layer 14 and the first granular magnetic layer 15 are different, it was confirmed that the coercivity Hc becomes large, and the parameters ΔHs and α' become small, thereby displaying desirable characteristics from the point of view of the magnetic characteristics or properties of the perpendicular magnetic recording medium 10. In the case of the samples S3 and S4, it was confirmed that particularly desirable characteristics from the point of view of the magnetic characteristics or properties of the perpendicular magnetic recording medium 10 may be obtained. In the case of the sample in which the granular recording layer has the single-layer structure, it was confirmed that the coercivity Hc becomes small, and the parameters ΔHs and α' become large.

Hence, in order to improve the magnetic separation (or isolation) of the magnetic crystal grains in the granular magnetic layers 15 and 16, the magnetic separation state (or isolation state) of the oxide phase and the metal phase of the granular material needs to be satisfactory. The magnetic separation state of the Co alloy phase and various oxide phase is satisfactory for $Co$—$SiO_2$ or $Co$—$Cr_2O_3$, and $SiO_2$ and $Cr_2O_3$ are desirable oxide materials to be used for the non-magnetic granular layer 14.

In addition, when $Cr_2O_3$ or $SiO_2$ is used for the non-magnetic granular layer 14, and the same kind of oxide material is used for the non-magnetic granular layer 14 and the first granular magnetic layer 15, it was confirmed that the parameters ΔHs and α' become large.

On the other hand, because $TiO_2$ may not obtain a satisfactory magnetic separation state with respect to the Co alloy, $TiO_2$ is unsuited as the oxide material of the granular recording layer having the single-layer structure, that is, the granular recording layer made up solely of the second granular magnetic layer 16. Furthermore, when $TiO_2$ is used as the oxide material of the granular recording layer having the single-layer structure, it is may be difficult to obtain a large coercivity Hc.

Accordingly, in this embodiment, the oxides of the non-magnetic granular layer 14 and the first granular magnetic layer 15, and more preferably the oxides of the non-magnetic granular layer 14, the first granular magnetic layer 15 and the second granular magnetic layer 16, are made mutually different, in order to further reduce the size of the magnetic crystal grains forming the second granular magnetic layer 16, make the magnetic crystal grain sizes of the second granular magnetic layer 16 more uniform, and further reduce the variation in the crystal orientation of the magnetic crystal grains in the second granular magnetic layer 16.

Figure 4:
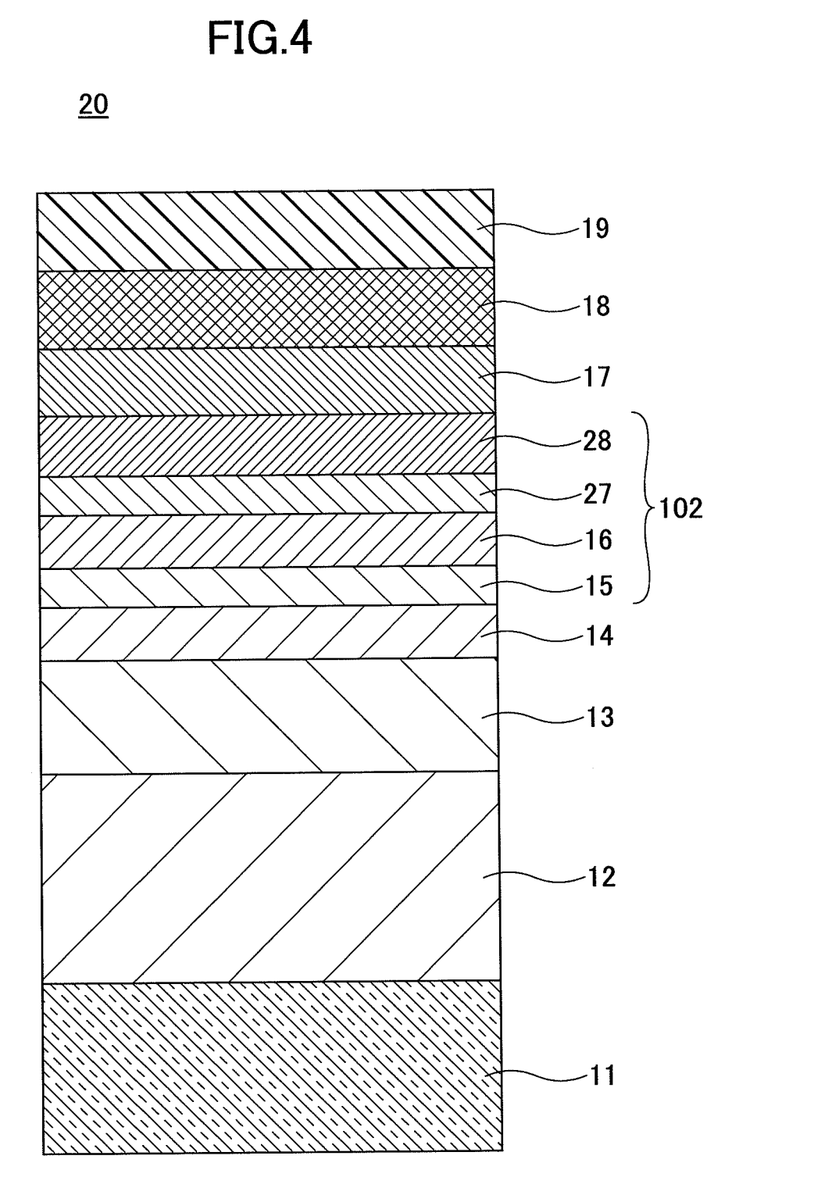
FIG. 4 is a cross sectional view illustrating the structure of the magnetic recording medium in a second embodiment of the present invention.

FIG. 4 is a cross sectional view illustrating the structure of the magnetic recording medium in a second embodiment of the present invention. In this embodiment, the present invention is applied to a perpendicular magnetic recording medium having an ECC (Exchange-Coupled Composite) structure. In FIG. 4, those parts that are the same as those corresponding parts in FIG. 1 are designated by the same reference numerals, and a description thereof will be omitted.

As illustrated in FIG. 4, a recording layer 102 of a perpendicular magnetic recording medium 20 has a stacked structure including a first granular magnetic layer 15, a second granular magnetic layer 16, a coupling control layer 27, and a third granular magnetic layer 28. By making the oxides of the non-magnetic granular layer 14, the first granular magnetic layer 15 and the second granular magnetic layer 16 mutually different also in this embodiment, it may be to further reduce the size of the magnetic crystal grains forming the second granular magnetic layer 16, make the magnetic crystal grain sizes of the second granular magnetic layer 16 more uniform, and further reduce the variation in the crystal orientation of the magnetic crystal grains in the second granular magnetic layer 16. In addition, by providing the coupling control layer 27, the magnetization reversal field may be reduced to thereby enable a satisfactory recording even when a granular material having a large magnetic anisotropy is used for the recording layer 102.

For example, the non-magnetic granular layer 14 may be formed by 3.5 nm thick $Co_{60}Cr_{40}$-$6Cr_2O_3$, the first granular magnetic layer 15 may be formed by 2.5 nm thick $Co_{66}Cr_{13}Pt_{21}$-$8SiO_2$, the second granular magnetic layer 16 may be formed by 8.0 nm thick $Co_{73}Cr_9Pt_{18}$-$8TiO_2$, the coupling control layer 27 may be formed by 0.30 nm thick $Ru_{65}CO_{35}$, the third granular magnetic layer 28 may be formed by 5.0 nm thick $Co_{70}Cr_{19}Pt_{11}$-$8TiO_2$, and the cap layer 17 may be formed by 7.0 nm thick $Co_{70}Cr_{19}Pt_8B_3$.

Figure 5:
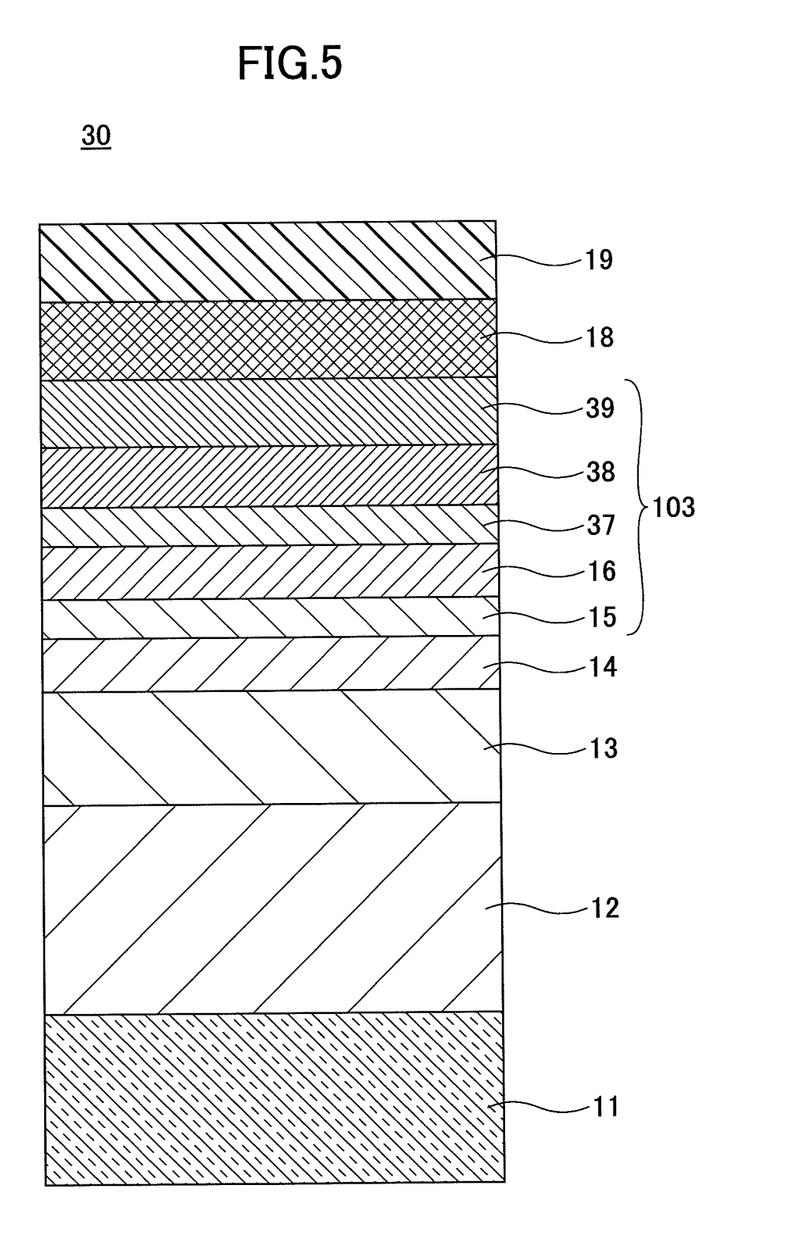
FIG. 5 is a cross sectional view illustrating the structure of the magnetic recording medium in a third embodiment of the present invention.

FIG. 5 is a cross sectional view illustrating the structure of the magnetic recording medium in a third embodiment of the present invention. In this embodiment, the present invention is applied to a perpendicular magnetic recording medium having an ESM (Element Specific Magnetization) structure. In FIG. 5, those parts that are the same as those corresponding parts in FIG. 1 are designated by the same reference numerals, and a description thereof will be omitted.

As illustrated in FIG. 5, a recording layer 103 of a perpendicular magnetic recording medium 30 has a stacked structure including a first granular magnetic layer 15, a second granular magnetic layer 16, a third granular magnetic layer 37, a fourth granular magnetic layer 38, and a fifth granular magnetic layer 39. By making the oxides of the non-magnetic granular layer 14, the first granular magnetic layer 15 and the second granular magnetic layer 16 mutually different also in this embodiment, it may be to further reduce the size of the magnetic crystal grains forming the second granular magnetic layer 16, make the magnetic crystal grain sizes of the second granular magnetic layer 16 more uniform, and further reduce the variation in the crystal orientation of the magnetic crystal grains in the second granular magnetic layer 16.

Figure 6:
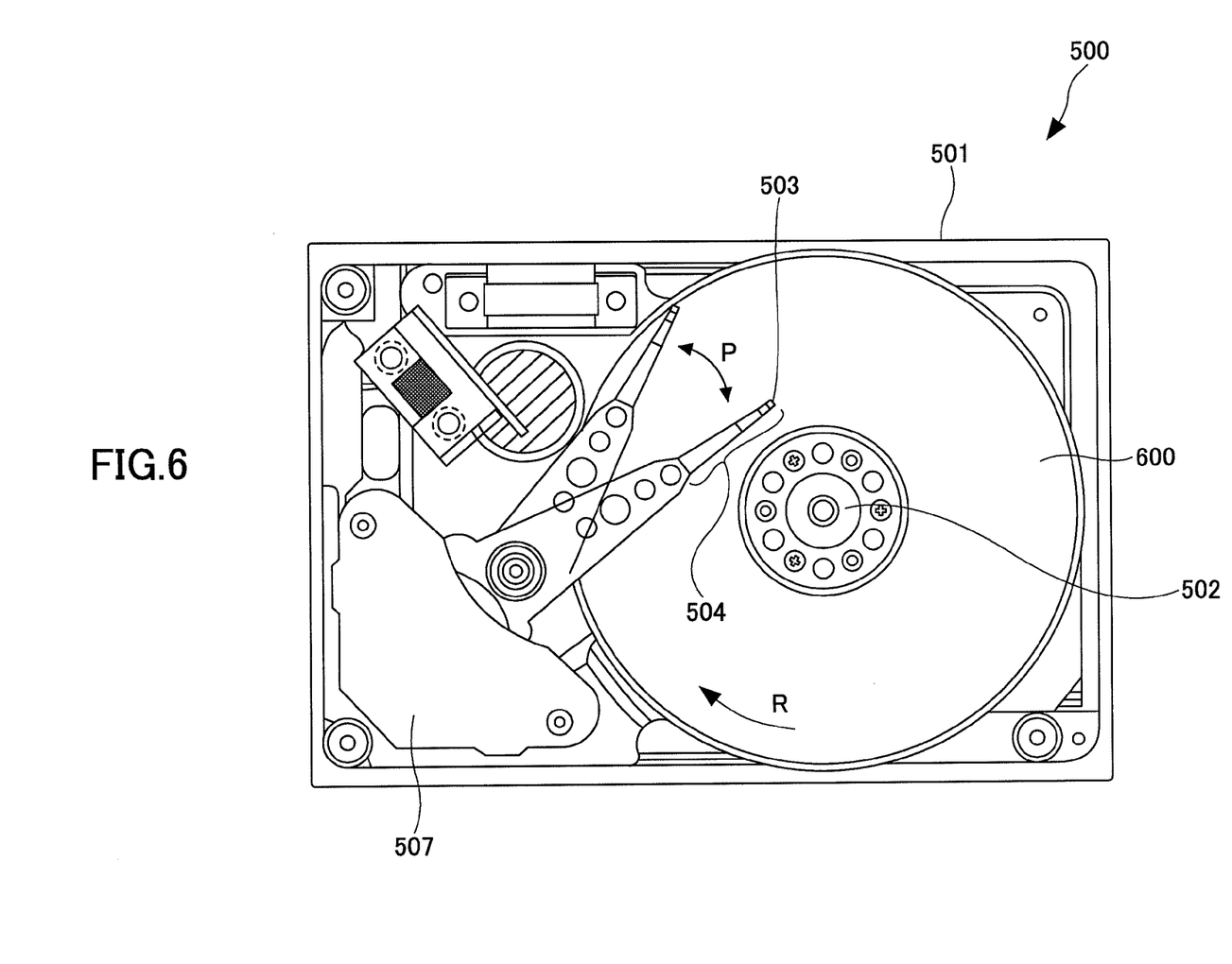
FIG. 6 is a plan view illustrating a part of a storage apparatus in one embodiment of the present invention.

Next, a description will be given of a storage apparatus in one embodiment, by referring to FIG. 6. FIG. 6 is a plan view illustrating a part of the storage apparatus in one embodiment of the present invention, in a state in which a top cover of the storage apparatus is removed.

A storage apparatus 500 includes a disk-shaped perpendicular magnetic recording medium 600, a spindle motor (not illustrated) to rotate the perpendicular magnetic recording medium 600 fixed on a hub 602, a magnetic head 503 to write information on and/or read information from the perpendicular magnetic recording medium 600, a suspension 504 to support the magnetic head 503, an actuator 507 to drive and control the suspension 504 in a radial direction of the perpendicular magnetic recording medium 600, and the like, which are provided within a casing 501.

The perpendicular magnetic recording medium 600 has the structure of any of the perpendicular magnetic recording media 10, 20 and 30 of the first, second and third embodiments described above. When the perpendicular magnetic recording medium 600 is rotated in an arrow direction R by the spindle motor, the magnetic head 503 floats by a predetermined amount from the surface of the perpendicular magnetic recording medium 600 due to an air current generated by the rotation of the perpendicular magnetic recording medium 600. The magnetic head 503 is moved in a radial direction P of the perpendicular magnetic recording medium 600 by the actuator 507, and information is written on and/or read from the perpendicular magnetic recording medium 600.

Because the perpendicular magnetic recording medium 600 provided within the storage apparatus 500 has the structure of any of the perpendicular magnetic recording media 10, 20 and 30 of the first, second and third embodiments described above, a high-density recording may be realized.

Of course, the number of perpendicular magnetic recording media 600 provided within the storage apparatus 500 is not limited to one, and a plurality of perpendicular magnetic recording media 600 may be provided within the storage apparatus 500.

In addition, the perpendicular magnetic recording medium in each of the embodiments described above is not limited to the so-called magnetic disk having the disk shape, and may be applicable to various kinds of magnetic recording media, including magnetic recording cards.

This application is based upon and claims the benefit of priority of the prior Japanese Patent Application No. 2009-069062, filed on Mar. 19, 2009 before the Japan Patent Office, the entire contents of which are incorporated herein by reference.

Further, the present invention is not limited to these embodiments, but various variations and modifications may be made without departing from the scope of the present invention.

DESCRIPTION OF REFERENCE NUMERALS 10, 20, 30, 600 Perpendicular Magnetic Recording Medium
11 Substrate
12 Soft Magnetic Back Layer
13 Intermediate Layer
14 Non-Magnetic Granular Layer
15 First Granular Magnetic Layer
16 Second Granular Magnetic Layer
17 Cap Layer
18 Protection Layer
19 Lubricant Layer 101, 102, 103 Recording Layer
500 Storage Apparatus
503 Magnetic Head

The invention claimed is:

1. A magnetic recording medium comprising:
a non-magnetic granular layer; and
a recording layer provided on the non-magnetic granular layer,
wherein the recording layer includes a first granular magnetic layer provided on the non-magnetic granular layer, and a second granular magnetic layer provided on the first granular magnetic layer, and
wherein a non-magnetic material magnetically separating metal grains of the non-magnetic granular layer is different from a non-magnetic material magnetically separating magnetic grains of the first granular magnetic layer,
wherein an oxide material having a maximum content in each of the non-magnetic granular layer, the first granular layer, and the second granular layer magnetic layer are all different, and
wherein a non-magnetic material used for magnetic separation in each of the non-magnetic granular layer, the first granular magnetic layer, and the second granular magnetic layer consists of a single oxide selected from the group consisting of $SiO_2$, $TiO_2$, and $Cr_2O_3$.

2. The magnetic recording medium as claimed in claim 1, wherein the non-magnetic material magnetically separating the magnetic grains of the first granular magnetic layer is different from a non-magnetic material magnetically separating magnetic grains of the second granular magnetic layer.

3. The magnetic recording medium as claimed in claim 1, at least one of the first granular magnetic layer and the second granular magnetic layer has a hard magnetic characteristic and a magnetic anisotropy constant Ku of $2\times10^6$ erg/cc or greater.

4. The magnetic recording medium as claimed in claim 1, further comprising:
a soft magnetic back layer formed by a soft magnetic material; and
an intermediate layer formed by Ru or a Ru alloy and provided on the soft magnetic back layer,
wherein the non-magnetic granular layer is provided on the intermediate layer.

5. The magnetic recording medium as claimed in claim 4, further comprising:
at least one third granular magnetic layer provided above the second granular magnetic layer.

6. The magnetic recording medium as claimed in claim 5, further comprising:
a coupling control layer provided between the second granular magnetic layer and the at least one third granular magnetic layer.

7. A storage apparatus comprising:
at least one magnetic recording medium; and
a magnetic head configured to write information on and/or read information from the magnetic recording medium,
wherein the magnetic recording medium comprises:
a non-magnetic granular layer; and
a recording layer provided on the non-magnetic granular layer,
wherein the recording layer includes a first granular magnetic layer provided on the non-magnetic granular layer, and a second granular magnetic layer provided on the first granular magnetic layer, and
wherein a non-magnetic material magnetically separating metal grains of the non-magnetic granular layer is different from a non-magnetic material magnetically separating magnetic grains of the first granular magnetic layer,
wherein an oxide material having a maximum content in each of the non-magnetic granular layer, the first granular layer, and the second granular layer magnetic layer are all different, and
wherein a non-magnetic material used for magnetic separation in each of the non-magnetic granular layer, the first granular magnetic layer, and the second granular magnetic layer consists of a single oxide selected from the group consisting of $SiO_2$, $TiO_2$, and $Cr_2O_3$.

8. The storage apparatus as claimed in claim 7, wherein the non-magnetic material magnetically separating the magnetic grains of the first granular magnetic layer is different from a non-magnetic material magnetically separating magnetic grains of the second granular magnetic layer.

9. The storage apparatus as claimed in claim 7, at least one of the first granular magnetic layer and the second granular magnetic layer has a hard magnetic characteristic and a magnetic anisotropy constant Ku of $2\times10^6$ erg/cc or greater.

10. The storage apparatus as claimed in claim 7, wherein the magnetic recording medium further comprises:
a soft magnetic back layer formed by a soft magnetic material; and
an intermediate layer formed by Ru or a Ru alloy and provided on the soft magnetic back layer,
wherein the non-magnetic granular layer is provided on the intermediate layer.

* * * * *